United States Patent [19]
Nishikata

[11] Patent Number: 5,923,810
[45] Date of Patent: Jul. 13, 1999

[54] INDEX SIGNAL RECORDING AND REPRODUCTION APPARATUS AND METHOD FOR A RECORDING MEDIUM

[75] Inventor: Takeharu Nishikata, Chiba, Japan

[73] Assignee: Sony Corporation, Japan

[21] Appl. No.: 08/873,989

[22] Filed: Jun. 12, 1997

Related U.S. Application Data

[63] Continuation of application No. 08/538,982, Oct. 5, 1995, abandoned, which is a continuation of application No. 08/197,822, Feb. 17, 1994, abandoned.

[30] Foreign Application Priority Data

Feb. 22, 1993 [JP] Japan .............................. P05-032066

[51] Int. Cl.⁶ .................................................. H04N 5/93
[52] U.S. Cl. ............................ 386/56; 386/95; 360/72.1; 360/13
[58] Field of Search ................................ 360/27, 57, 13, 360/14.1, 72.2, 72.1; 379/100; 386/52, 64, 56, 63, 65, 95

[56] References Cited

U.S. PATENT DOCUMENTS

| | | | |
|---|---|---|---|
| 5,038,231 | 8/1991 | Harigaya et al. ........................ | 360/72.2 |
| 5,124,807 | 6/1992 | Dunlap et al. ...................... | 360/14.1 X |
| 5,301,228 | 4/1994 | Kakigi et al. ............................ | 379/100 |
| 5,396,374 | 3/1995 | Kubota et al. ............................. | 360/13 |
| 5,488,409 | 1/1996 | Yuen et al. ............................. | 360/72.2 |
| 5,621,579 | 4/1997 | Yuen ..................................... | 360/69 X |

*Primary Examiner*—Andrew L. Sniezek
*Attorney, Agent, or Firm*—Rader, Fishman & Grauer; Ronald P. Kananen

[57] ABSTRACT

A signal recording and reproduction apparatus and method for a recording medium, wherein when an eject button is depressed, a video sub-code (VSC) area where no information is recorded is retrieved from the VSC areas near the position of the end of the reproduction operation of the medium. The index information recorded in an index information memory is recorded in that retrieved VSC area. When information on the medium is to be reproduced after that, the index information is read from the VSC area near the position of the end of the previous reproduction operation for the heading operation.

6 Claims, 3 Drawing Sheets

INDEX SIGNAL RECORDING AND REPRODUCTION APPARATUS AND METHOD FOR A RECORDING MEDIUM

This application is a continuation, of application Ser. No. 08/538,982 filed on Oct. 5, 1995 which is a continuation of application Ser. No. 08/197,822 filed on Feb. 17, 1994, both now abandoned.

BACKGROUND OF THE INVENTION

1. Field of the Invention

The present invention relates to a signal recording and reproduction apparatus for heading and reproducing signals from a recording medium at a high speed.

2. Description of the Related Art

A video cassette tape may have recorded on it content such as titles and abstracts and index information including heading information like the address of the start of recording (hour, minute, second, frame).

Signal recording and reproduction apparatuses for video cassette tapes and the like (hereinafter referred to as VTRs) first read the index information on video cassette tapes loaded in them, then use that index information to record signals on or reproduce them from the video cassette tapes. The index information is updated each time the user operates the VTR for recording and reproduction.

There is known a VTR which records the index information at a predetermined area of the video cassette tape, such as its start or end.

In another known conventional VTR, the index information is recorded on a piece of magnetic tape attached to the outside of the video cassette tape especially for recording the index information.

When a video cassette tape which has been recorded or reproduced halfway is loaded in the former conventional VTR, however, and it is attempted to continue recording or reproduction from that intermediate position, the tape has to first be rewound or fast forwarded to the beginning or end of the tape where the index information is recorded so as to read the index information or else accurate heading is not possible. As a result, heading and reproduction from the intermediate position cannot be performed at a high speed.

In the latter conventional VTR, further, the magnetic tape on which the index information was recorded was not protected, so the magnetic tape would peel off or be scratched and the index information would therefore sometimes be lost.

SUMMARY OF THE INVENTION

The object of the present invention is to provide an apparatus and method for recording and reproducing signals on or from a recording medium which enables heading of the recording medium at a high speed from the initial position, or course, and even an intermediate position.

According to a first aspect of the present invention, there is provided a signal recording and reproduction apparatus which reads out index information recorded on a tape-like recording medium and performs recording and reproduction of signals on and from the recording medium based on the index information, the signal recording and reproduction apparatus, including a memory for recording index information, a reading and recording means for reading index information recorded in an index area on the recording medium near the position of reproduction and recording it in the memory before the start of the reproduction from the recording medium, an index information updating means for updating the index information recorded in the memory in accordance with the reproduction or recording operation from or on the recording medium, and a recording means for reading out the updated index information from the memory when the reproduction or recording operation of the recording medium is ended and recording that index information in an empty index area near the position of the recording medium where the reproduction or recording operation had ended.

According to a second aspect of the present invention, there is provided a signal recording and reproduction method which reads index information recorded in a tape-like recording medium and performs recording and reproduction of signals on and from the recording medium based on the index information, the signal recording and reproduction method, including the steps of reproducing index information recorded in an index area on the recording medium near the position of reproduction before the start of the next reproduction from the recording medium, recording the reproduced index information in a memory, updating the index information recorded in the memory in accordance with the reproduction or recording operation from or on the recording medium, and reading out the updated index information from the memory when the reproduction or recording operation of the recording medium is ended and recording that index information in an empty index area near the position of the recording medium where the reproduction or recording operation had ended.

BRIEF DESCRIPTION OF THE DRAWINGS

The above objects and features and the other objects and features of the present invention will be more apparently by the following description with reference to the accompanying drawings, in which.

DESCRIPTION OF THE PREFERRED EMBODIMENTS

In the signal recording and reproduction apparatus of the present invention, for example, before the start of reproduction of signals from the recording medium loaded in the signal recording and reproduction apparatus, a reading means is used to read the initial index information of the recording medium when rewinding and the index information recorded at an index area near the position where the previous reproduction or recording operation ended when run to an intermediate position. This information is recorded in a recording means.

After this, for example, use is made of an erasing means to erase the index information of the index area of the recording medium read by the reading means, not including the initial index information, to make the index region empty.

The signal recording and reproduction apparatus then starts the reproduction of signals of the recording medium using the index information recorded in the recording means. Accordingly, even if a recording medium which has been run to an intermediate position is loaded, the signals can be immediately reproduced or recorded.

During reproduction, the index information recorded in the recording means is updated by an index information updating means in accordance with the reproduction operation of the recording medium.

After this, when the reproduction operation from the recording medium is ended and, for example, a command is given to the signal recording and reproduction apparatus to eject the recording medium, a writing means is used to read the index information from the recording means and record it in an index area near the position where the reproduction operation of the recording medium had been ended.

The index information temporarily recorded at an empty index area is erased by the erasing means when the next reproduction operation is performed, so temporary index information is recorded at only one location of the recording medium at any one time.

A first embodiment of the present invention will next be explained. In this explanation, as the signal recording and reproduction apparatus of the present invention, the example will be used of a signal recording and reproduction apparatus for recording information on and reproducing it from an 8 mm video tape on which information is sequentially recorded.

Figure 1:
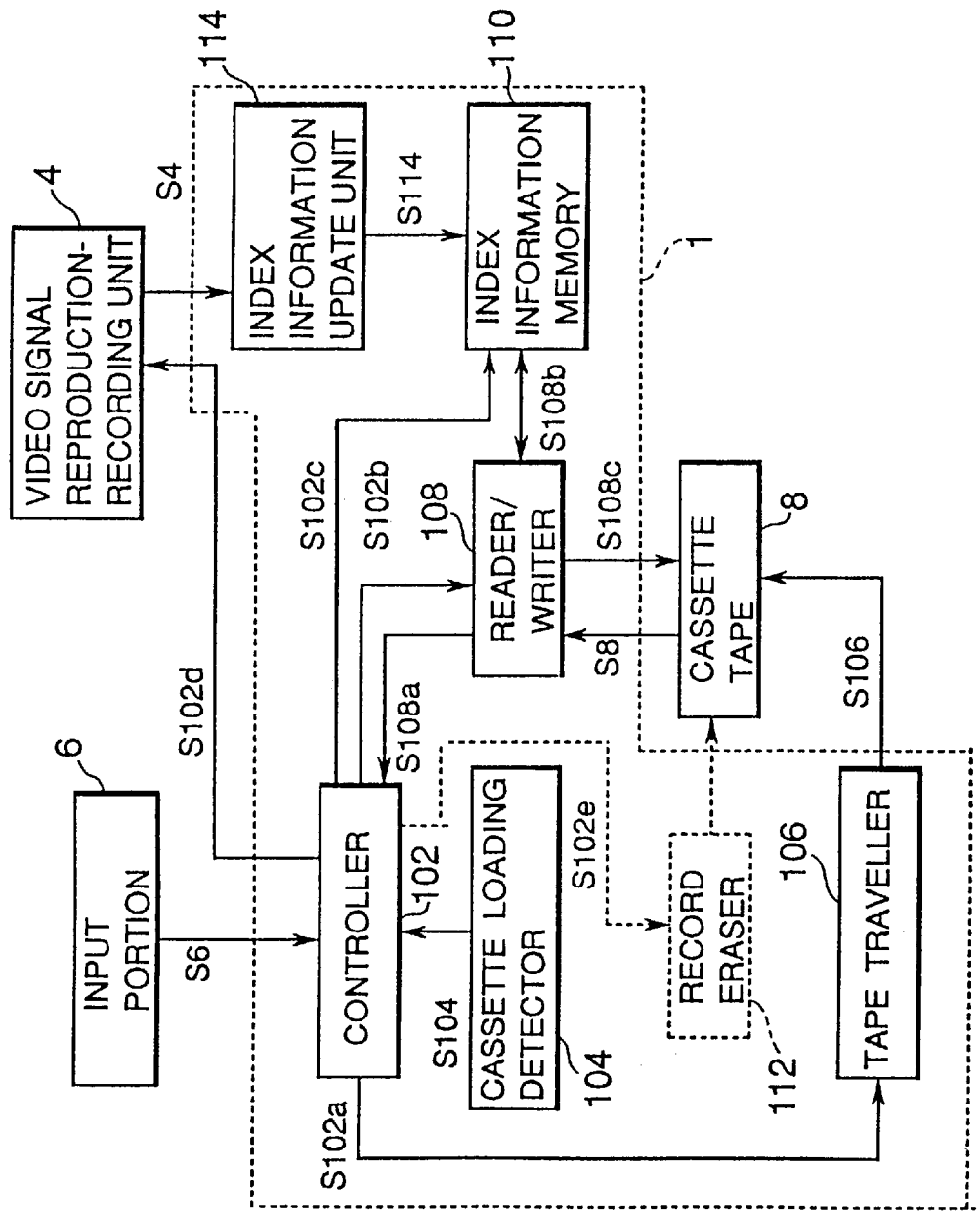
FIG. 1 is a view of the configuration of an index information processing unit of a signal recording and reproduction apparatus according to an embodiment of the present invention.

FIG. 1 is a view of the configuration of an index information processing unit of a signal recording and reproduction apparatus according to an embodiment of the present invention.

As shown in FIG. 1, the index information processing unit 1 is comprised of a controller 102, a cassette loading detector, a reader/writer serving as a reading means and writing means, a tape traveller 106, an index information memory 110 serving as a recording means, and an index information update unit 114 serving as an index information updating means.

The cassette loading detector 104 outputs a detection signal S104 to the controller 102 when it detects that a cassette tape 108 has been loaded in the signal recording and reproduction apparatus.

The tape traveller 106 runs the cassette tape 8 based on a tape travel signal S102 when the tape travel signal S102 is received from the controller 102.

The index information memory 110 receives the index signal S108b showing the index information from the reader/writer 108 and records the same on the cassette tape 8.

The index information memory 110 erases the recording when receiving as input a refresh signal S102c from the controller 102.

The reader/writer 108, when receiving from the controller 102 a signal 8102b commanding it to detect the presence or absence of index information, detects if index information is recorded in the index area near the position of the reproduction operation of the cassette tape 8 and outputs to the controller 102 a signal S108a indicating the results of detection.

The reader/writer 108, further, when receiving from the controller 102 a signal S108a instructing it to read index information, reads index information from the index area of the cassette tape 8 and records an index information signal S108b based on the results of the reading operation in the index information memory 110.

The reader/writer 108, when receiving from the controller 102 a signal S102a instructing it to write index information, reads the index information recorded in the index information memory 110, retrieves an index area of the cassette tape 8 where information is not recorded, and records the index information in the retrieved index area.

Note that, as mentioned earlier, here the example is take where the cassette tape 8 is an 8 mm video tape. The index information may include the content of the video signals, for example titles and abstracts, and heading information, for example, the address of the start of recording of the video programs (hour, minute, second, frame).

The index information update unit 114 receives from the video signal reproduction-recording portion 4 a signal S4 instructing it to update index information when information is to be reproduced from the cassette tape 8. Based on this signal S4, it updates the index information recorded in the index information memory 110.

The controller 102 performs the following processing:

First, an explanation will be made here of processing in the controller 102 from the state where the cassette tape 8 has not yet been loaded to the writing of index information to the index information memory 110.

Figure 2:
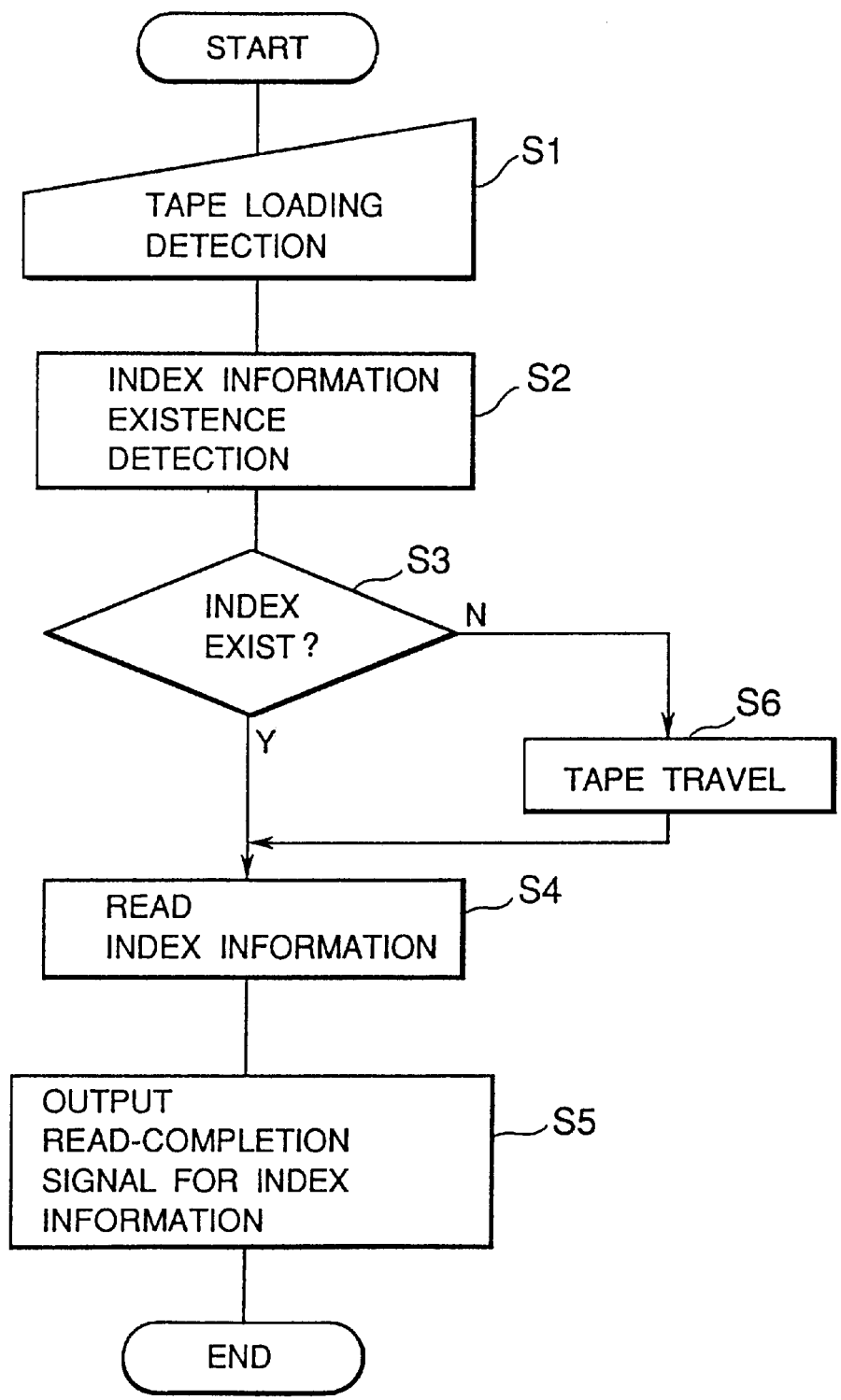
FIG. 2 is a flow chart of the processing from the state before the cassette tape is loaded to the writing of index information in an index information memory in a controller for the signal recording and reproduction apparatus according to the first embodiment.

FIG. 2 is a flow chart of that processing.

At step S1, the controller 102 receives as input a detection signal S104 from the cassette loading detector 104, whereupon the routine proceeds to step S2.

At step S2, the controller 102 outputs a signal S102b to the reader/writer 108 instructing it to detect for the presence or absence of index information. When the reader/writer 108 receives the signal S102b from the controller 102, it detects if index information has been recorded in the video sub-code (VSC) area near the position of reproduction of the cassette tape 8 and outputs a signal S102b showing the results of the detection to the controller 102.

At step S3, the controller 102 judges if the signal S102b received as input from the reader/writer 108 at step S2 indicates that there is index information. If there is, the routine proceeds to step S4. On the other hand, if the signal S102b indicates there is no index information, the routine proceeds to step S6.

At step S6, the controller 102 outputs a tape travel signal S102a to the tape traveller 106. The tape traveller 106 receives the signal S102a and makes the cassette tape 8 travel until the position where the index information is recorded.

At step 4, on the other hand, the controller 102 outputs to the reader/writer 108 a signal S102b instructing it to read the index information. The reader/writer 108 receives this signal S102b, reads the index information from the cassette tape 8, and outputs an index information signal S108b based on the results of the reading operation to the index information memory 110 for recording there.

At step S5, the controller 102 outputs to the reproduction-recording portion 4 a signal S102d indicating the completion of the reading of the index information. The video signal reproduction-recording portion 4, when receiving this signal S102a from the controller 102, performs the usual reproduction and recording processing using the index information recorded in the index information memory 110.

During this reproduction and recording processing, the signal S4 from the video signal reproduction-recording unit 4 instructing updating of the index information is output to the index information update unit 114. The index information recorded in the index information memory 110 is then updated by the index information update unit 114.

Next, an explanation will be made of the processing from the depression of the eject button to the writing of index information in the cassette tape 8.

Figure 3:
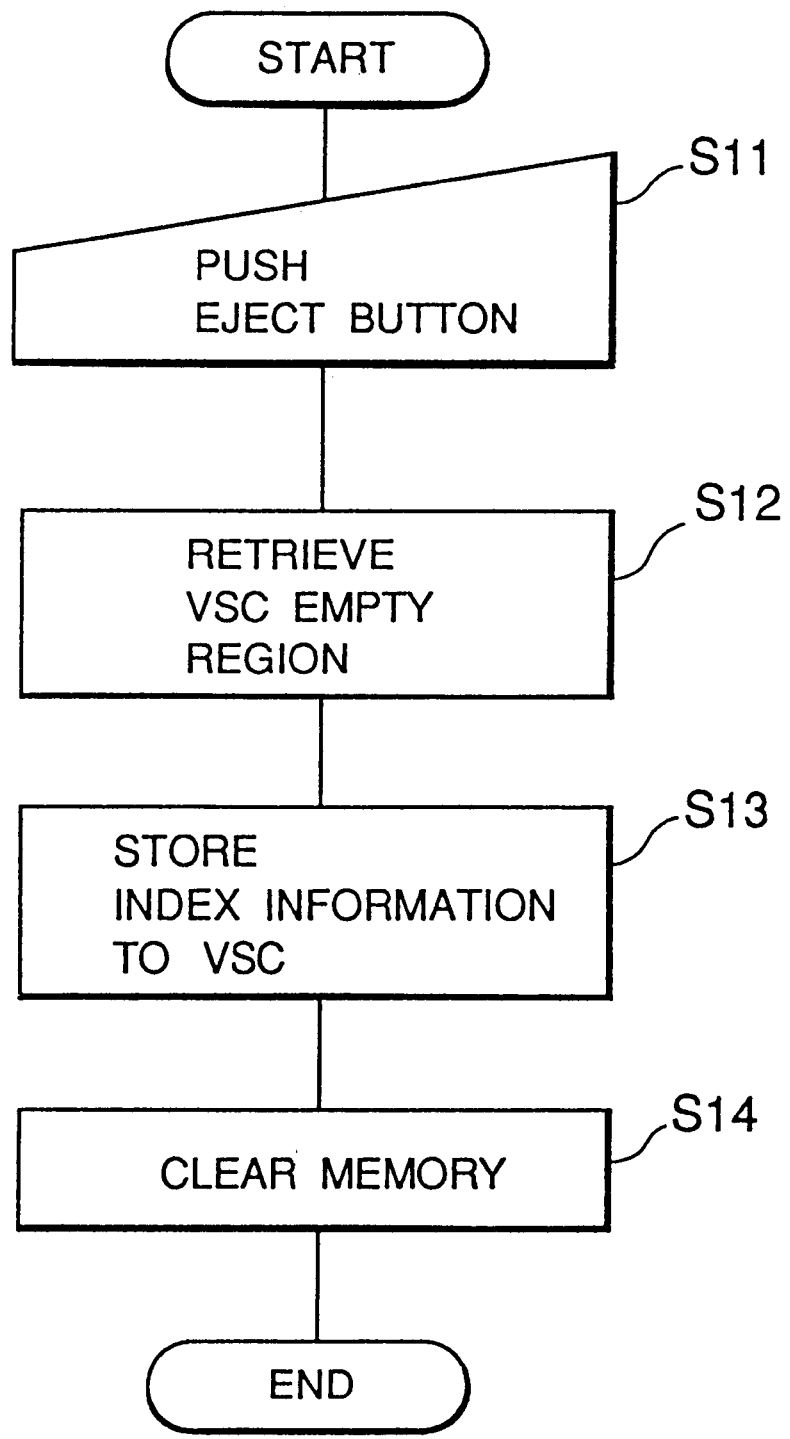
FIG. 3 is a flow chart of the processing from the depression of an eject button to the writing of index information in a cassette tape.

FIG. 3 is a flow chart of that processing.

At step S11, the controller 102 receives a signal S6 from an input portion 6 indicating that a user has depressed an eject button for ejecting the cassette tape 8 from the signal recording and reproduction apparatus, after which the routine proceeds to step S12.

At step S12, the controller 102 outputs a retrieval signal S102b to the reader/writer 108.

The reader/writer 108, when receiving the retrieval signal S102b from the controller 102, performs heading to a VSC area near the position where the reproduction operation of the cassette tape 8 had ended and retrieves an empty VSC area where no valid information is recorded.

At step S13, the controller 102 outputs to the reader/writer 108 a signal S102b instructing writing of index information. The reader/writer 108, when receiving this signal S102b from the controller 102, records the index information recorded in the index information memory 110 in the VSC area retrieved at step S12.

At step S14, the controller 102 outputs a refresh signal S102c to the index information memory 110.

The index information memory 110, when receiving this refresh signal S102c from the controller 102, erases the recorded index information.

As explained above, according to the index information processing unit 1 of the signal recording and reproduction apparatus of the present embodiment, when the eject button is depressed after the end of the reproduction operation, the index information recorded in the index information memory 110 is recorded near the position where the reproduction of the cassette tape 8 ended.

When the cassette tape 8 is loaded in the signal recording and reproduction apparatus after this and reproduction is restarted, the reader/writer 108 can read the index information from near the position where the previous reproduction operation of the cassette tape 8 ended.

Accordingly, there is no need to rewind or fast-forward the tape to the beginning or end of the tape at which the index information is recorded as in the signal recording and reproduction apparatus described in the section on related art and thus it is possible to speed up the reading of index information. By this, it is possible to shorten the time required until the start of reproduction after loading of a cassette tape 8 to the signal recording and reproduction apparatus.

The index information processing unit of the signal recording and reproduction apparatus of the present embodiment, as shown in FIG. 1, is comprised of the index information processing unit 1 of the first embodiment explained above plus a recorded data eraser 112 as an erasing means.

The recorded data eraser 112 receives this erasing signal S102e from the controller 102, then erases the index information recorded in the VSC area of the cassette tape 8 to make the VSC area empty.

The processing in the controller 102 of the present embodiment is substantially the same as that of the controller 102 of the first embodiment explained above, but the following processing is further performed at step S4 shown in FIG. 2.

The controller 102 outputs a signal S102b instructing the reader/writer to read information as explained at step S4 of the first embodiment.

Then, the controller 102 outputs an erasing signal S102e to the recorded data eraser 112.

The recorded data eraser 112 receives this erasing signal S102e from the controller 102, then erases the index information recorded in the VSC area of a local oscillation circuit 9 to make the VSC area empty.

As explained above, the index information processing unit of the signal recording and reproduction apparatus of the present embodiment erases the index information recorded in the VSC area of the cassette tape 8 when reading index information from the cassette tape 8.

Accordingly, it is possible to record signals for other purposes at the VSC areas where no index information is recorded and therefore to make effective utilization of the VSC areas.

The present invention is not limited to the above embodiments. For example, the cassette tape 8 need not be an 8 mm video tape, but may be a video tape of the VHS format etc., a digital audio tape (DAT), etc.

According to the signal recording and reproduction apparatus of a recording medium of the present invention, when reproducing signals from a recording medium on which information is sequentially recorded, it is possible to read at a high speed the index information recorded on the recording medium and therefore high speed heading and reproduction become possible.

Further, according to the signal recording and reproduction apparatus of a recording medium of the present invention, the index information is recorded in an index region of the recording medium, so is effectively protected along with the other information recorded on the recording medium.

Still further, according to the signal recording and reproduction apparatus of a recording medium of the present invention, the index information recorded on the recording medium is erased by an erasing means after being read by a reading means, so it is possible to prevent unnecessary index information from remaining on the recording medium.

What is claim is:

1. A signal recording and reproduction apparatus for reading out index information recorded on a video tape recording medium and performing recording and reproduction of signals on and from the video tape recording medium based on the index information, which comprises:

a memory for recording index information which includes titles, abstracts and start addresses of video signals;

a reader/writer, having means for reading the index information recorded in an index area on the video tape recording medium near a position of reproduction, and means for erasing said index information when reading said index information, leaving said index area empty, and means for writing the index information into the memory before the start of the reproduction from the video tape recording medium; and an index information updating means for updating the index information recorded in the memory in accordance with the reproduction and recording operation from and on the video tape recording medium;

wherein said reader/writer further comprises means for reading out the updated index information from the memory when the reproduction and recording operation of the video tape recording medium is ended, means for searching for, and retrieving, an empty index area, where information is not recorded, near the position of the video tape recording medium where the reproduction or recording operation had ended, and, means for writing the updated index information in the empty index area.

2. A signal recording and reproduction apparatus as set forth in claim 1, wherein:

further provision is made of a first detecting means for detecting that a cassette accommodating said video tape recording medium has been loaded, said reading and writing means responding to said first detecting means, and further provision is made of a second detecting means for detecting that an eject button for ejecting the cassette has been depressed, said reading and writing means responding to said second detecting means.

3. A signal recording and reproduction apparatus as set forth in claim 1, wherein:

said video tape recording medium is an 8 mm video tape, and said index area is a video sub-code area of the 8 mm video tape.

4. A signal recording and reproduction apparatus as set forth in claim 1, further comprising a memory clearing means for clearing the updated index information stored in the memory upon writing the updated index information in the empty index area.

5. A signal recording and reproduction method of reading index information including titles, abstracts and start addresses of video signals, from a video tape recording medium, and performing recording and reproduction of signals on and from the video tape recording medium based on the index information, which comprises the steps of:

reading the index information recorded in an index area on the video tape recording medium near a position of reproduction, and erasing said index information from said index area when reading said index information, before the start of the reproduction from the video tape recording medium;

recording the reproduced index information in a memory;

updating the index information recorded in the memory in accordance with the reproduction and recording operation from and on the video tape recording medium;

reading out the updated index information from said memory when the reproduction and recording operation of the video tape recording medium is ended; and searching for, and retrieving, an empty index area, where information is not recorded, near the position of the video tape recording medium where the reproduction and recording operation had ended, and writing the updated index information in the empty index area.

6. A signal recording and reproduction method as set forth in claim 5, further comprising a memory clearing step for clearing the updated index information stored in the memory upon writing the updated index information in the empty index area.

* * * * *